United States Patent
Balakrishnan et al.

(10) Patent No.: US 10,135,357 B1
(45) Date of Patent: Nov. 20, 2018

(54) THRESHOLD DETECTION WITH TAP

(71) Applicant: Power Integrations, Inc., San Jose, CA (US)

(72) Inventors: Balu Balakrishnan, Saratoga, CA (US); David G. R. LeBlanc, Dunrobin (CA); David Michael Hugh Matthews, Los Gatos, CA (US); Robert J. Mayell, Los Altos, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 15/698,492

(22) Filed: Sep. 7, 2017

(51) Int. Cl.
*H02M 7/00* (2006.01)
*H02M 7/219* (2006.01)
*H02M 1/00* (2006.01)

(52) U.S. Cl.
CPC .......... *H02M 7/003* (2013.01); *H02M 7/219* (2013.01); *H02M 2001/0009* (2013.01)

(58) Field of Classification Search
CPC ................. H02M 7/003; H02M 7/219; H02M 2001/0009
See application file for complete search history.

(56) References Cited

U.S. PATENT DOCUMENTS

| | | | |
|---|---|---|---|
| 4,754,310 A | 6/1988 | Coe | |
| 4,811,075 A | 3/1989 | Eklund | |
| 4,893,158 A | 1/1990 | Mihara et al. | |
| 5,014,178 A | 5/1991 | Balakrishnan | |
| 5,086,364 A | 2/1992 | Leipold et al. | |
| 5,146,298 A | 9/1992 | Eklund | |
| 5,164,659 A | 11/1992 | Schultz et al. | |
| 5,216,275 A | 6/1993 | Chen | |
| 5,282,107 A | 1/1994 | Balakrishnan | |
| 5,285,369 A | 2/1994 | Balakrishnan | |
| 5,313,082 A | 5/1994 | Eklund | |
| 5,313,381 A | 5/1994 | Balakrishnan | |
| 5,438,215 A | 8/1995 | Tihanyi | |
| 5,637,898 A | 6/1997 | Baliga | |
| 5,973,360 A | 10/1999 | Tihanyi | |
| 5,977,763 A | 11/1999 | Loughmiller et al. | |

(Continued)

OTHER PUBLICATIONS

Horwitz et al., U.S. Appl. No. 15/486,191, filed Apr. 12, 2017.

(Continued)

*Primary Examiner* — Emily P Pham
(74) *Attorney, Agent, or Firm* — Christensen O'Connor Johnson Kindness PLLC

(57) ABSTRACT

A controller for use in a power converter includes a power switch including a drain, a source, a control input, and a tap. The power switch includes a first transistor coupled to a second transistor, a drain of the first transistor is coupled to the drain of the power switch and the source of the first transistor is coupled to the tap. A tap sense circuit is coupled to the tap. A drive circuit is coupled to receive an indicator signal from the tap sense circuit. The indicator signal is indicative of a voltage at the tap or the current through the first transistor. The drive circuit is coupled to receive a feedback signal representative of an output quantity of the power converter. The drive circuit is coupled to generate a drive signal to control switching of the power switch in response to the indicator signal and the feedback signal.

26 Claims, 7 Drawing Sheets

(56) References Cited

U.S. PATENT DOCUMENTS

| | | | |
|---|---|---|---|
| 5,998,833 | A | 12/1999 | Baliga |
| 6,184,555 | B1 | 2/2001 | Tihanyi et al. |
| 6,207,994 | B1 | 3/2001 | Rumennick et al. |
| 6,388,286 | B1 | 5/2002 | Baliga |
| 6,388,853 | B1 | 5/2002 | Balakrishnan et al. |
| 6,449,207 | B2 | 9/2002 | Sher et al. |
| 6,525,372 | B2 | 2/2003 | Baliga |
| 6,627,958 | B2 | 9/2003 | Letavic et al. |
| 6,635,544 | B2 | 10/2003 | Disney |
| 6,640,435 | B2 | 11/2003 | Balakrishnan |
| 6,668,451 | B2 | 12/2003 | Balakrishnan |
| 6,750,640 | B2 | 6/2004 | Balakrishnan et al. |
| 6,865,093 | B2 | 3/2005 | Disney |
| 6,954,057 | B2 | 10/2005 | Balakrishnan et al. |
| 6,987,299 | B2 | 1/2006 | Disney et al. |
| 7,002,398 | B2 | 2/2006 | Disney |
| 7,170,756 | B2 | 1/2007 | Balakrishnan |
| 7,227,733 | B2 | 1/2007 | Balakrishnan et al. |
| 7,205,824 | B2 | 4/2007 | Disney |
| 7,221,011 | B2 | 5/2007 | Banerjee et al. |
| 7,308,754 | B2 | 12/2007 | Balakrishnan |
| 7,335,944 | B2 | 2/2008 | Banerjee et al. |
| 7,336,095 | B2 | 2/2008 | Erickson et al. |
| 7,400,483 | B2 | 7/2008 | Balakrishnan et al. |
| 7,932,738 | B1 | 4/2011 | Banerjee et al. |
| 7,998,817 | B2 | 8/2011 | Disney |
| 8,120,097 | B2 | 2/2012 | Disney |
| 8,305,826 | B2 | 11/2012 | Banerjee et al. |
| 8,670,220 | B2* | 3/2014 | Pansier ............... H02H 3/24 |
| | | | 361/86 |
| 9,219,420 | B1 | 12/2015 | Zhang et al. |
| 9,479,065 | B2 | 10/2016 | Mao et al. |
| 9,667,154 | B2 | 5/2017 | Colbeck |
| 2002/0175351 | A1 | 11/2002 | Baliga |
| 2009/0322426 | A1* | 12/2009 | Nyboe ............... H03F 1/52 |
| | | | 330/251 |
| 2010/0163990 | A1 | 7/2010 | Ko |
| 2010/0301412 | A1 | 12/2010 | Parthasarathy et al. |
| 2011/0272758 | A1 | 11/2011 | Banerjee et al. |
| 2013/0176032 | A1* | 7/2013 | Zimmanck ......... G01R 31/327 |
| | | | 324/415 |
| 2015/0062974 | A1* | 3/2015 | Lund .................. G01R 19/175 |
| | | | 363/21.04 |
| 2017/0264281 | A1* | 9/2017 | Mathad ......... H03K 17/08104 |

OTHER PUBLICATIONS

Fujihira, "Theory of Semiconductor Superjunction Devices," Matsymoto Factory, Fuji Electric Co., Ltd., Apr. 12, 2001 Tsukama, Matsumoto 390, Japan; Graduate School of Engineering, Yamanashi University, Apr. 3, 2011 Takeda, Koufu 400, Japan.

Fujihira, T., et al., "Simulated Superior Performances of Semiconductor Superjunction Devices," Matsumoto Factory, Fuji Electrical Co., Ltd., Apr. 18, 2001 Tsukama, Matsumoto 390-0821, Japan; Graduate School of Engineering, Yamanashi University, until Mar. 31, 1998 Takeda, Koufu 400, Japan.

* cited by examiner

THRESHOLD DETECTION WITH TAP

BACKGROUND INFORMATION

Field of the Disclosure

The present invention relates generally to power converters, and more specifically to switch mode power converters.

Background

Electronic devices use power to operate. Switched mode power converters are commonly used due to their high efficiency, small size and low weight to power many of today's electronics. Conventional wall sockets provide a high voltage alternating current. In a switching power converter, a high voltage alternating current (ac) input is converted to provide a well-regulated direct current (dc) output through an energy transfer element. The switched mode power converter controller usually provides output regulation by sensing one or more inputs representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

Typical losses experienced in a power converter are conduction losses and switching losses. Conduction losses and switching losses occur due to the electrical resistance in the circuit and the parasitic capacitance that is switched by the power converter, particularly when the power switch is a transistor. When the power switch conducts current, the resistance of the circuit along with the current passing in the circuit generates conduction loss. Switching losses are generally associated with the losses which occur while the power switch of the power converter is transitioning between an ON state and an OFF state or vice versa. In one example, a switch that is ON (or closed) may conduct current, while a switch that is OFF (or open) cannot conduct current. When the power switch is open, voltage across the switch stores energy in the parasitic capacitance. The parasitic capacitance discharges when the power switch closes, dissipating the energy stored in the parasitic capacitance in the resistance of the power switch to produce switching loss. Further, switching losses may result from having a non-zero voltage across the power switch when the power switch turns ON, or from having a non-zero current through the power switch when the power switch turns OFF.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
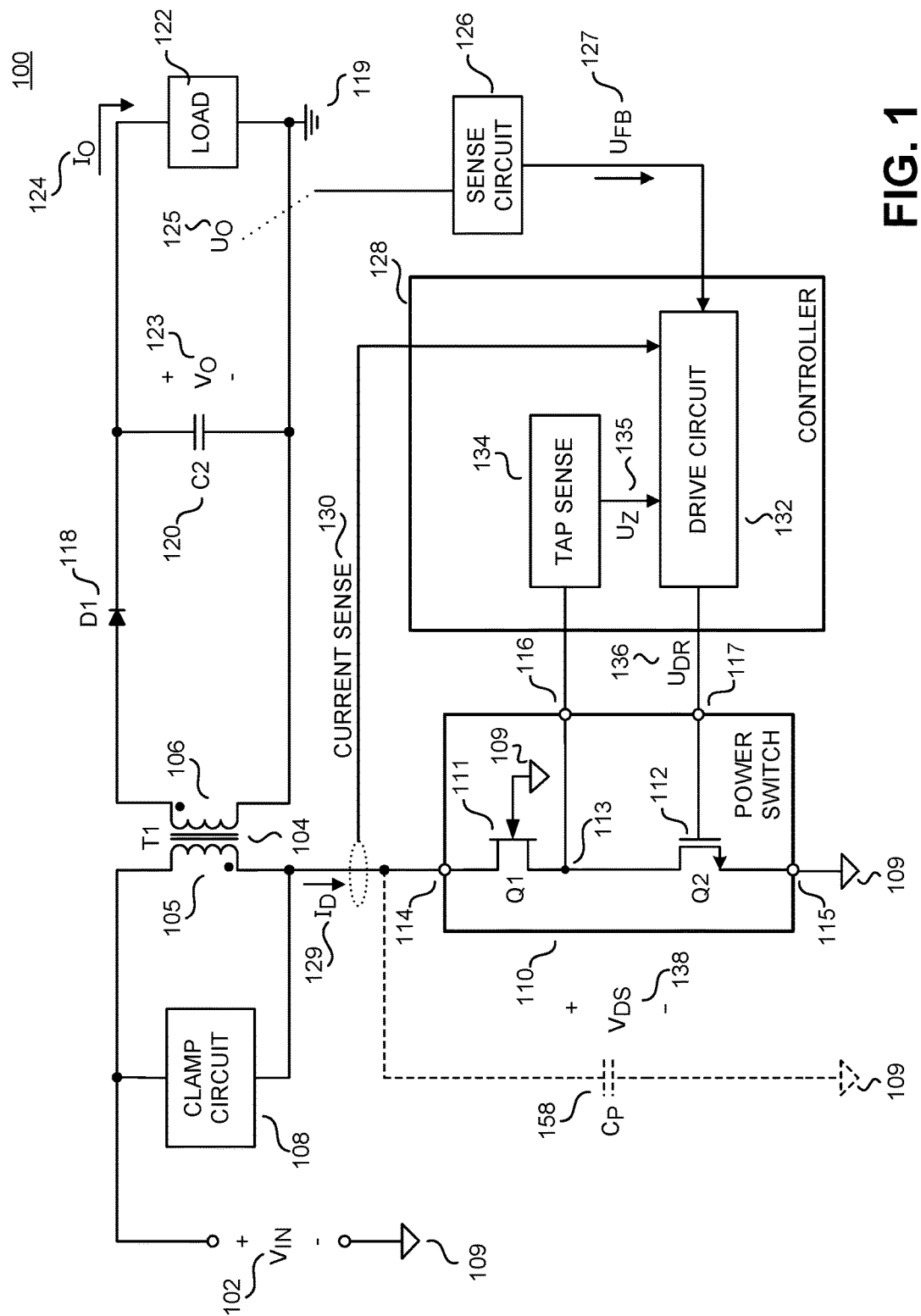
FIG. 1 is a functional block diagram of an example power converter and controller, in accordance with an embodiment of the disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Switching losses of a power converter can be reduced by ensuring that the voltage across the power switch is substantially zero prior to the power switch turning ON. The voltage across the power switch is determined by sensing the drain terminal of the power switch. This sensing generally requires a separate pin for the power converter controller to receive the sensed voltage which can increase the overall cost of the controller.

In one example of the present disclosure, the power switch is a four terminal device and includes a first transistor, such as a junction field effect transistor (JFET) or a gallium nitride high-electron-mobility transistor (GaN HEMT), and a second transistor, such as a metal-oxide-semiconductor field effect transistor (MOSFET). The power switch includes a drain, source, gate, and tap. The drain of the power switch corresponds with the drain of the first transistor while the source and gate of the power switch correspond with the source and gate of the second transistor. Further, the tap corresponds to the source of the first transistor. In one example of the present disclosure, the voltage at the tap or current through the first transistor may be monitored to determine the voltage or current at the drain of the power switch. As such, the tap may be used to determine if the voltage across the power switch is above or below a threshold. The controller includes a tap sense circuit which senses the voltage at the tap or current through the first transistor and outputs an indicator signal which indicates if the voltage at the drain is above or below the threshold.

To illustrate, FIG. 1 shows a function block diagram of an example power converter 100 including a power switch 110 and a controller 128 in accordance with the teachings of the present invention. The illustrated example of the power converter 100 includes an energy transfer element 104, a primary winding 105 of the energy transfer element 104, a secondary winding 106 of the energy transfer element 104, a clamp circuit 108, a power switch 110, an input return 109, an output rectifier D1 118, an output capacitor C2 120, an output return 119, a sense circuit 126, the power switch 110, and the controller 128. The power switch 110 is shown as including a first transistor Q1 111, which is shown as JFET or GaN HEMT, coupled to a second transistor Q2 112, which is shown as MOSFET, a drain 114, a source 115, a tap 116, a gate 117 (also referred to as a control input), and a node 113, which is at the junction between the first transistor Q1 111 and the second transistor Q2 112. Further, the controller is shown as including a tap sense circuit 134 and a drive circuit 132. In dashed lines, a capacitance $C_P$ 158 is shown to represent all the capacitance that couples to the power switch 110 and may include natural capacitance internal to the energy transfer element 104, the natural internal capacitance of power switch 110, and/or discrete capacitors. Also shown in FIG. 1 are an input voltage $V_{IN}$ 102, an output voltage $V_O$ 123, an output current $I_O$ 124, an output quantity $U_O$ 125, a feedback signal $U_{FB}$ 127, a switch current $I_D$ 129, a current sense signal 130, a drive signal $U_{DR}$ 136, an indicator signal $U_Z$ 135, and a power switch voltage $V_{DS}$ 138. In the illustrated example, the power converter 100 is shown as having a flyback topology. It is appreciated that other known topologies and configurations of power converters may also benefit from the teachings of the present disclosure.

The power converter 100 provides output power to a load 122 from an unregulated input voltage $V_{IN}$ 102, which may be a rectified and filtered ac line voltage or a dc input voltage. The input voltage $V_{IN}$ 102 is coupled to the energy transfer element 104. In some embodiments, the energy transfer element 104 may be a coupled inductor, transformer, or an inductor. The example energy transfer element 104 shown in FIG. 1 includes two windings, a primary winding 105 and a secondary winding 106. However, in other examples, the energy transfer element 104 may have more than or less than two windings. Coupled across the primary winding 105 is the clamp circuit 108, which limits the maximum voltage across the power switch 110.

The primary winding 105 is further coupled to the power switch 110 and the power switch 110 is further coupled to input return 109. The voltage across the power switch 110 is denoted as power switch voltage $V_{DS}$ 138 (which is also the voltage across the parasitic capacitance $C_P$ 158). In one example, power switch 110 includes a first transistor Q1 111 coupled to a second transistor Q2 112. One end of the first transistor Q1 111 is coupled to a drain 114 of power switch 110, and the other end of the first transistor Q1 111 is coupled to a tap 116 of the power switch 110. The control of the first transistor Q1 111 is coupled to the input return 109. One end of the second transistor Q2 112 is also coupled to the drain 114 of power switch 114, which in one example is through the first transistor Q1 111. The other end of the second transistor Q2 112 is coupled to the source 115 of the power switch 110, which is also coupled to the input return 109. The control of the second transistor Q2 112 is coupled to the gate 117 of the power switch 110.

To illustrate, the example depicted in FIG. 1 shows the power switch 110 is exemplified as including a JFET or GaN HEMT 111 and a MOSFET 112. The drain 114 of the power switch 110 (which is coupled to the drain of the first transistor Q1 111, and is also coupled to the drain of the second transistor Q2 112 through the first transistor Q1 111) is coupled to the primary winding 105. The source 115 of the power switch 110 (which is coupled to the source of the second transistor Q2 112) is coupled to input return 109. The gate of the first transistor Q1 111 is coupled to input return 109 while the gate of the second transistor Q2 112 is the gate 117 of the power switch 110, which is coupled to receive the drive signal $U_{DR}$ 136 from the controller 128. Further, the source of the first transistor Q 111 is coupled to the tap 116. In the depicted example, the drain of the second transistor Q2 112 is coupled to the source of the first transistor Q1 111 at a node 113, which is coupled to the tap 116. The second transistor Q2 112 may be used as the main switching element of the power switch 110 while the first transistor Q1 111 may be used to divert a portion of the drain current $I_D$ 129 conducted through the power switch 110 to the tap 116. In one example, the diverted current may be used to charge a supply capacitor during startup of the power converter 100. As will be further discussed, the voltage at the tap 116 or the current through the first transistor Q1 111 may be monitored to sense the voltage on the drain terminal 114 of the power switch 110 or the power switch voltage $V_{DS}$ 138.

The secondary winding 106 is coupled to the output rectifier D1 118 (exemplified as a diode). However, the output rectifier D1 118 may be a transistor used as a synchronous rectifier. Output capacitor C2 120 is shown as being coupled to the output rectifier D1 118 and output return 119. The power converter 100 further includes circuitry to regulate the output, which is exemplified as output quantity $U_O$ 125. In general, the output quantity $U_O$ 125 is an output voltage $V_O$ 123, and output current $I_O$ 124, or a combination of the two. A sense circuit 126 is coupled to sense the output quantity $U_O$ 125 and to provide the feedback signal $U_{FB}$ 127, which is representative of the output quantity $U_O$ 125.

As shown, the controller 128 is coupled to receive the feedback signal $U_{FB}$ 127. The controller 128 is also coupled to receive the current sense signal 130 and provides the drive signal $U_{DR}$ 136. The current sense signal 130 is representative of the drain current $I_D$ 129 received at the drain 114 of the power switch 110 and may be a voltage or current signal. In addition, the controller 128 provides drive signal $U_{DR}$ 136 to the power switch 110 to control various switching parameters to control the transfer of energy from the input of power converter 100 through the energy transfer element 104 to the output of power converter 100. Examples of such parameters may include switching frequency (or period), duty cycle, ON and OFF times of the power switch 110, or varying the number of pulses per unit time of the power switch 110. Power switch 110 (second transistor Q2 112) is opened and closed in response to the drive signal $U_{DR}$ 136. In operation, the switching of the power switch 110/second transistor Q2 112 produces a pulsating secondary current at the output rectifier D1 118. The secondary current is filtered by the output capacitor C2 120 to produce a substantially constant output voltage $V_O$ 123, output current $I_O$ 124, or a combination of the two. The controller 128 may be implemented as a monolithic integrated circuit or may be implemented with discrete electrical components or a combination of discrete and integrated components. Controller 128 and power switch 110 could form part of an integrated circuit that is manufactured as either a hybrid or monolithic integrated circuit.

Controller 128 includes the drive circuit 132 and the tap sense circuit 134. The tap sense circuit 134 is coupled to receive either the voltage at node 113 or the current through the first transistor Q1 111 via the tap 116. The tap sense circuit 134 compares the voltage at node 113/tap 116 or the current through the first transistor Q1 111 to a threshold and outputs the indicator signal $U_Z$ 135, which indicates if the voltage at the node 113/tap 116 or the current through the first transistor Q1 111 is above or below the threshold. The voltage and current at the source of the first transistor Q1 111 follows the voltage and current at the drain of the first transistor Q1 111 (drain terminal 114) when the voltage at the drain of the first transistor Q1 111 (drain terminal 114) is less than the pinch-off voltage of the first transistor Q1 111. As such, the tap sense circuit 134 can determine if the voltage at the drain 114 is above or below the threshold if the threshold is less than the pinch off voltage of the first transistor Q1 111. The drive circuit 132 is coupled to receive the feedback signal $U_{FB}$ 127, current sense signal 130, and the indicator signal $U_Z$ 135 to output the drive signal $U_{DR}$ 136. In one embodiment, the drive circuit 132 does not turn on the power switch 110 until the indicator signal $U_Z$ 135 indicates that the voltage at the tap 116 or the current through the first transistor Q1 111 is less than the threshold (and as such, the voltage at the drain terminal 114 is less than the threshold). In one example, the threshold could be set to near zero and as such the power switch 110 is not turned on until the voltage at the drain terminal 114 is approximately zero volts or near zero voltage. In one example, the threshold could be set to near zero amps and as such the power switch 110 is not turned on until the current at the drain 114 is approximately zero or near zero amps.

Figures 2A, 2B:
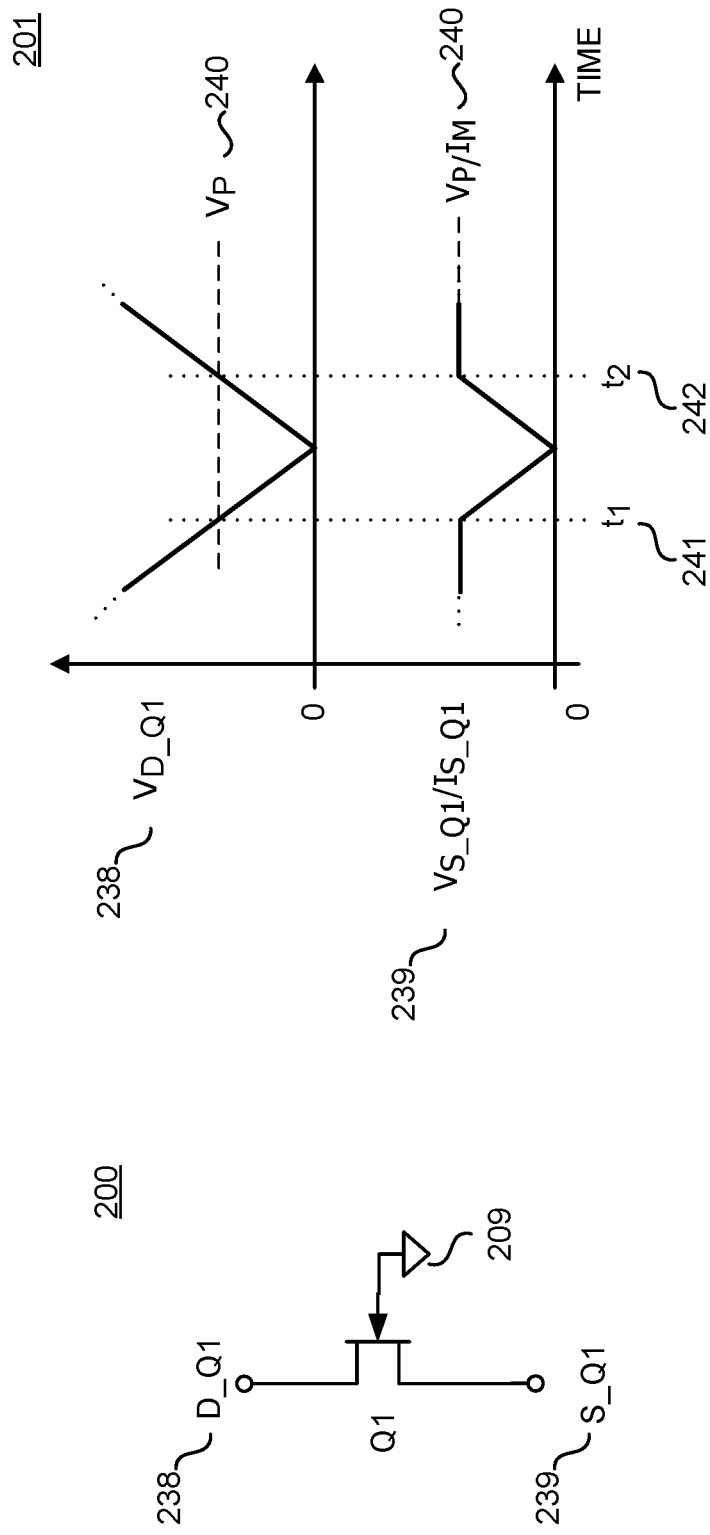
FIG. 2A is an example schematic of a first transistor, in accordance with an embodiment of the disclosure.
FIG. 2B is a timing diagram illustrating example voltage and currents of terminals of the first transistor of FIG. 2A, in accordance with an embodiment of the disclosure.

FIG. 2A illustrates a first transistor Q1 200, which is one example of the first transistor Q1 111 shown in FIG. 1. As shown, the first transistor Q1 200 is a three terminal device with a drain 238, source 239, and gate. The gate of the first transistor Q1 200 is coupled to input return 209. In this configuration, the voltage and current at the source 239 of the first transistor Q1 200 is substantially constant when the voltage at the drain 238 of the first transistor Q1 200 is greater than the first transistor's pinch-off voltage, and substantially follows the voltage at the drain 238 of first transistor Q1 200 when the voltage at the drain 238 of the first transistor Q1 200 is less than the pinch-off voltage.

FIG. 2B illustrates timing diagram 201 which shows the current and voltage at the source 239 of the first transistor Q1 200 in comparison to the voltage at the drain 238 of the first transistor Q1 200 shown in FIG. 2A. For explanation purposes, the first transistor Q1 drain voltage 238 is shown as a portion of a triangular waveform, decreasing to substantially zero volts then increasing from zero volts. Between times $t_1$ 241 and $t_2$ 242, the first transistor Q1 drain voltage 238 is less than the pinch-off voltage $V_P$ 240 and the first transistor Q1 source voltage/current 239 substantially follows the first transistor Q1 drain voltage 238. As shown, the first transistor Q1 source voltage/current 239 increases and decreases with the first transistor Q1 drain voltage 238. When the first transistor Q1 drain voltage 238 is greater than the pinch-off voltage $V_P$ 240, the first transistor Q1 source voltage/current 239 is substantially equal to a constant voltage and current. For example, the first transistor Q1 source voltage 239 is substantially equal to the pinch-off voltage $V_P$ 240 while the first transistor Q1 source current 239 is substantially equal to a maximum current $I_M$ 240.

Figure 3A:
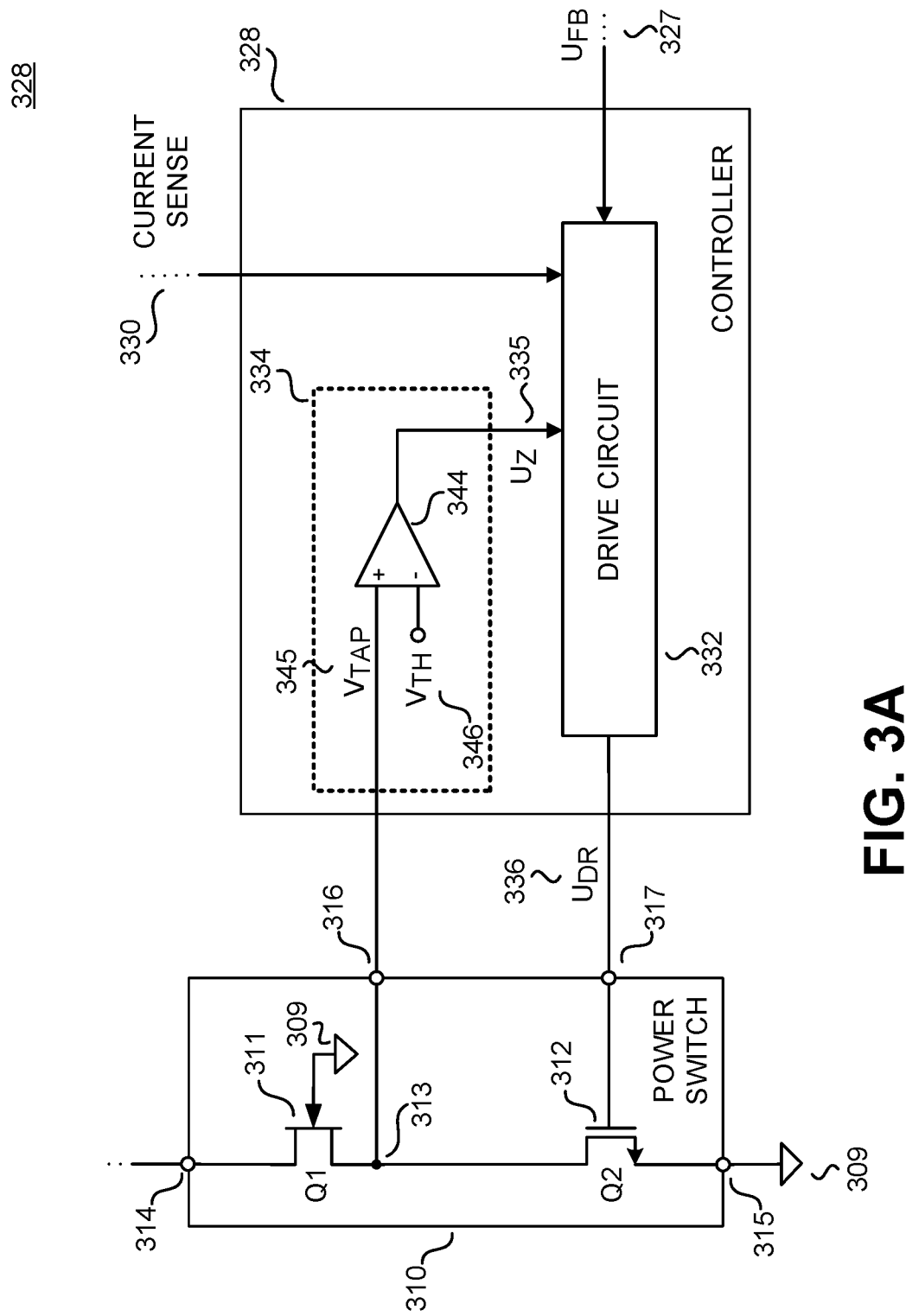
FIG. 3A is a functional block diagram of an example controller and power switch of FIG. 1, in accordance with an embodiment of the disclosure.

FIG. 3A illustrates an example controller 328 and power switch 310, which is one example of the controller 128 and power switch 110 discussed with respect to FIG. 1, and it should be appreciated that similarly named and numbered elements couple and function as discussed above. In particular, FIG. 3A illustrates one example of the tap sense circuit 334, which includes a comparator 344. The non-inverting input of the comparator is coupled to the tap 316 of the power switch 310 and receives the tap voltage $V_{TAP}$ 345 (voltage at node 313), while the inverting input of the comparator 344 is coupled to receive the threshold voltage $V_{TH}$ 346. In one example, the threshold voltage $V_{TH}$ 346 is less than the pinch-off voltage of the first transistor Q1 311 included in power switch 310. As such, when the tap voltage $V_{TAP}$ 345 falls below the threshold voltage $V_{TH}$ 346, the tap voltage $V_{TAP}$ 345 is indicative of the voltage at the drain terminal 314 of the power switch 310. The output of the comparator 344 is the indicator signal $U_Z$ 335. In operation, the tap sense circuit 334 compares the tap voltage $V_{TAP}$ 345 with the threshold voltage $V_{TH}$ 346. As coupled, the indicator signal $U_Z$ 335 is logic high when the tap voltage $V_{TAP}$ 345 is greater than the threshold voltage $V_{TH}$ 346, and logic low when the tap voltage $V_{TAP}$ 345 is less than the threshold voltage $V_{TH}$ 346. In one example, the threshold voltage $V_{TH}$ 346 could be set to near zero and as such the drive circuit 332 does not turn on the power switch 310 until the tap voltage $V_{TAP}$ 345 is less than the threshold voltage $V_{TH}$ 346.

Figure 3B:
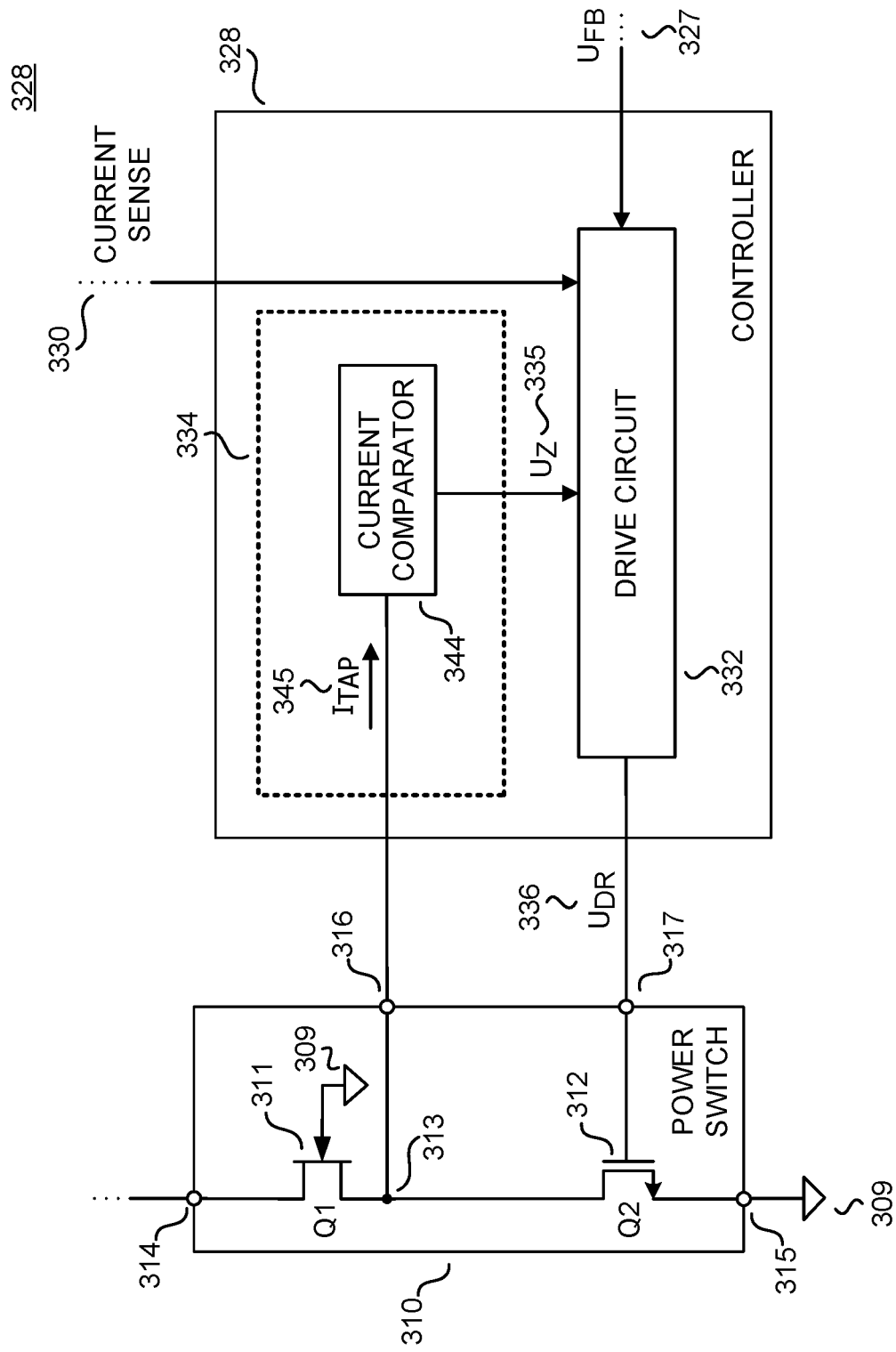
FIG. 3B is a functional block diagram of another example controller and power switch of FIG. 1, in accordance with an embodiment of the disclosure.

FIG. 3B illustrates another example controller 328 and power switch 310, which is one example of the controller 128 and power switch 110 discussed with respect to FIG. 1, and it should be appreciated that similarly named and numbered elements couple and function as discussed above. In particular, FIG. 3B illustrates another example of the tap sense circuit 334, which includes current comparator 344. The tap current $I_{TAP}$ 345 is representative of the current from tap 316, which is the current through the first transistor Q1 311 when the second transistor Q2 312 is off. The current comparator 344 is coupled to receive the tap current $I_{TAP}$ 345 and output the indicator signal $U_Z$ 335. In operation, the current comparator 344 compares the tap current $I_{TAP}$ 345 with a current threshold, which corresponds to a voltage that is less than the pinch-off voltage of the first transistor Q1 311 of the power switch 310. The indicator signal $U_Z$ 335 is a first logic level when the tap current $I_{TAP}$ 345 is greater than the current threshold and a second logic level when the tap current $I_{TAP}$ 345 is less than the current threshold. In one example, the current threshold could be set to near zero and as such the drive circuit 332 does not turn on the power switch 310 until the tap current $I_{TAP}$ 345 is less than the current threshold.

Figure 3C:
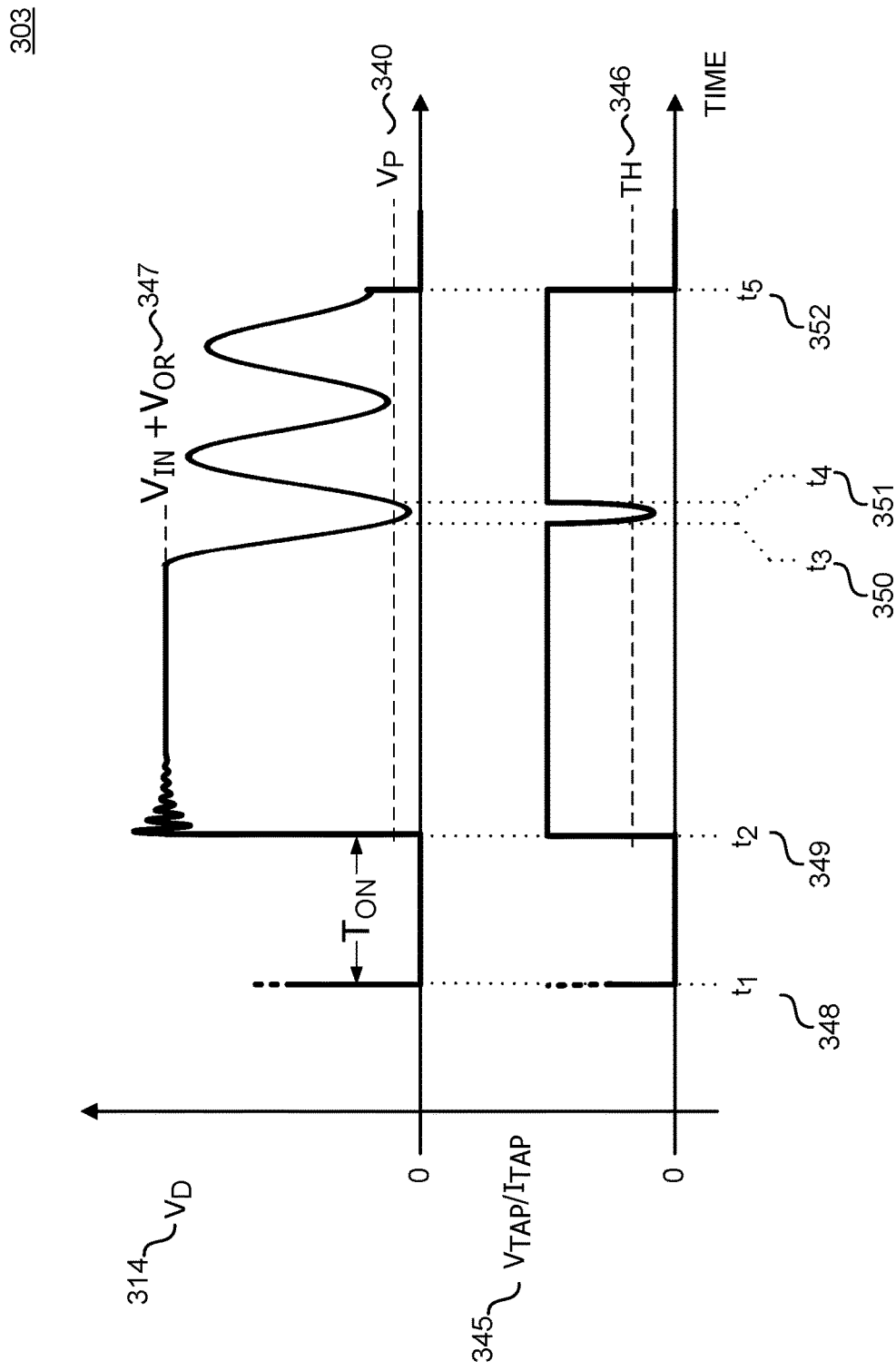
FIG. 3C is a timing diagram illustrating example voltage and currents of terminals of the power switch of FIGS. 3A and 3B, in accordance with an embodiment of the disclosure.

FIG. 3C illustrates timing diagram 303 including the drain voltage $V_D$ 314 at the drain terminal 314 of the power switch 310, and the tap voltage $V_{TAP}$ 345 at the tap 316/tap current $I_{TAP}$ 345 through the first transistor Q1 311. Between times $t_1$ 348 and $t_2$ 349, the power switch 310 is ON and both drain voltage $V_D$ 314 and the tap voltage/current $V_{TAP}/I_{TAP}$ 345 are substantially equal to zero. When the power switch 310 is turned OFF at time $t_2$ 349, the drain voltage $V_D$ 314 rises until the output rectifier (D1 118 shown in FIG. 1) conducts and clamps the voltage at the input voltage $V_{IN}$ plus the reflected output voltage $V_{OR}$, where the reflected output voltage is the voltage on the secondary winding of the energy transfer element (shown in FIG. 1) multiplied by the number of turns on the primary winding and divided by the number of turns on the secondary winding. As shown, the drain voltage $V_D$ 314 at the value of $V_{IN}$ plus $V_{OR}$ until the output rectifier stops conducting. The energy stored in the capacitance ($C_P$ 158 shown in FIG. 1) then dissipates in a decaying oscillation with the self-inductance of primary winding and the effective parasitic resistance of the circuit.

Between times $t_2$ 349 and $t_3$ 350, the drain voltage $V_D$ 314 is above the pinch-off voltage $V_P$ 340 of the first transistor Q1 311. As discussed above, the tap voltage/current $V_{TAP}/I_{TAP}$ 345 is substantially equal to the pinch-off voltage $V_P$ 340 or maximum current $I_M$ of the first transistor Q1 311, respectively. However, between times $t_3$ 350 and $t_4$ 351, the drain voltage $V_D$ 314 falls below the pinch-off voltage $V_P$ 340 and the tap voltage/current $V_{TAP}/I_{TAP}$ 345 substantially follows the drain voltage $V_D$ 314. In one example, the threshold TH 346 could be set to near zero and as such, the drive circuit 332 does not turn on the power switch 310 until when the tap voltage/current $V_{TAP}/I_{TAP}$ 345 falls below the TH 346 as shown in FIG. 3C between times $t_3$ 350 and $t_4$ 351. Between times $t_4$ 351 and $t_5$ 352, the drain voltage $V_D$ 314 rises above the pinch-off voltage $V_P$ 340, and the tap voltage/current $V_{TAP}/I_{TAP}$ 345 is again substantially equal to the pinch-off voltage $V_P$ 340 or maximum current $I_M$ of the first transistor Q1 311.

Figure 4:
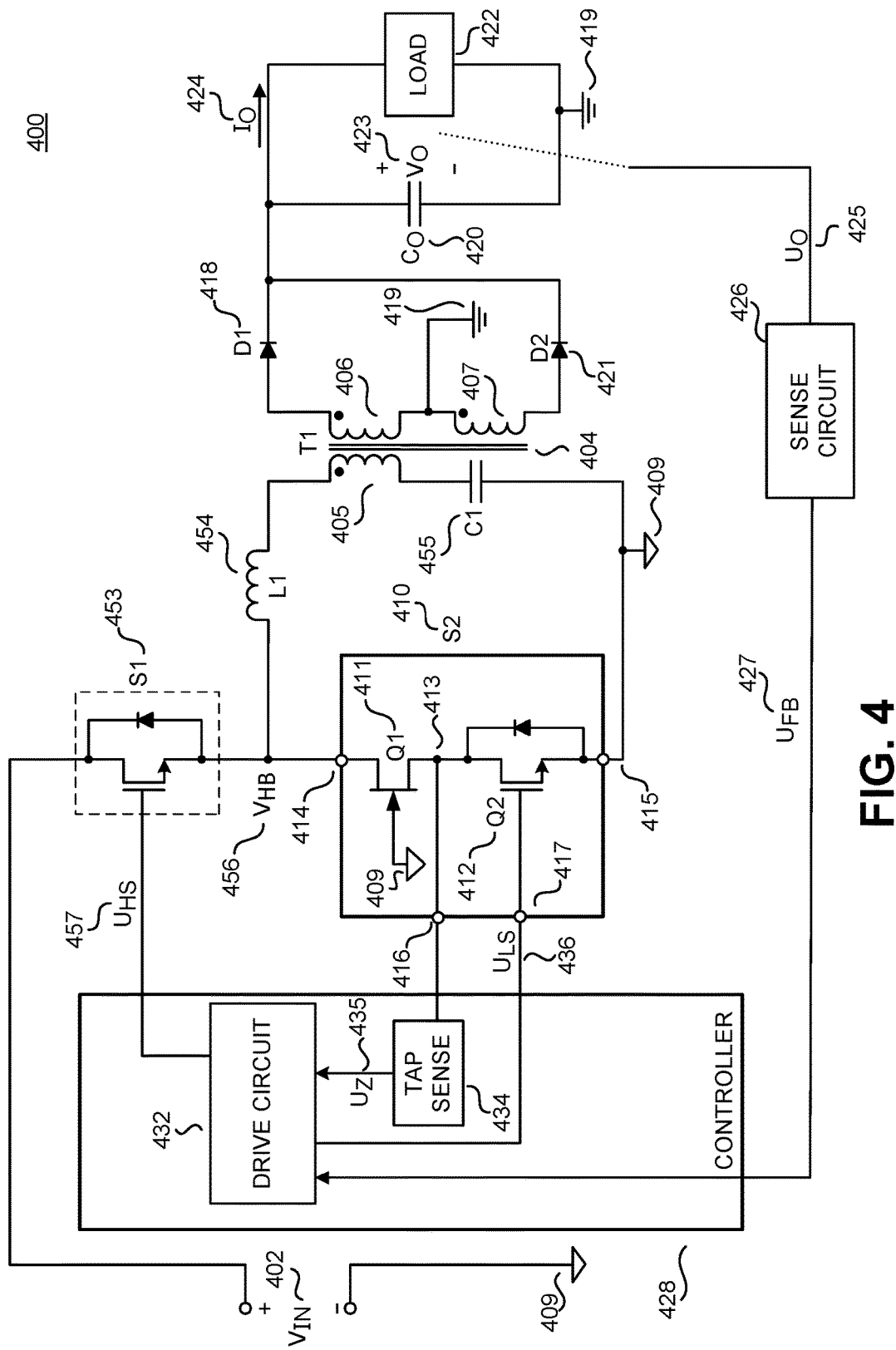
FIG. 4 is a functional block diagram of another example power converter and controller, in accordance with an embodiment of the disclosure.

FIG. 4 is a functional block diagram illustrating another example power converter 400, which may utilize the controller and power switch in accordance with embodiments of the present disclosure. The power converter 400 is coupled as an LLC resonant power converter and includes a switching circuit (power switches S1 453 and S2 410) coupled to an input of the resonant power converter 400 and an energy transfer element T1 404. A resonant tank circuit is also coupled to the switching circuit. A controller 428 is coupled to generate first and second drive signals $U_{HS}$ 457 and $U_{LS}$ 436 to control switching of the switching circuit to regulate a transfer of energy from the input to the output of the resonant power converter 400 through the energy transfer element T1 404. The resonant tank circuit includes tank inductance and a tank capacitance. In the depicted example, the resonant tank circuit is an LLC circuit such that the tank inductance includes a leakage inductance L1 454 and a transformer magnetizing inductance LM (not shown) of the energy transfer element T1 404. In the example, the tank capacitance includes capacitance C1 455. The leakage inductance and transformer magnetizing inductance can be either discrete components, or combined into a single transformer (with leakage and magnetizing elements). Power switches S1 453 and S2 410 are coupled together as a high side switch (S1 453) and a low side switch (S2 410) of a half bridge switching circuit, which coupled to the resonant tank circuit.

As illustrated, the resonant power converter 400 is coupled to receive an input voltage $V_{IN}$ 402 and provide output power to the load 422 coupled to the output of the resonant power converter 400. The high side switch S1 453 that is coupled to receive the input voltage $V_{IN}$ 402 at one end and coupled to the low side switch S2 410 at the other. The terminal between the high side switch S1 453 and the low side switch S2 410 may be referred to as the half bridge terminal with half bridge voltage $V_{HB}$ 456. In the example shown, the high side switch S1 453 and low side switch S2 410 are illustrated as including n-type metal-oxide-semiconductor field-effect transistors (MOSFETs) along with respective body diodes. The high side switch S1 453 and the low side switch S2 410 are controlled with first and second drive signals $U_{HS}$ 457 and $U_{LS}$ 436, respectively, such that the voltage across a primary winding 405 of the energy transfer element T1 404 is substantially a square wave. Embodiments of the present disclosure may be utilized to sense the half bridge voltage $V_{HB}$ 456 using the tap 416 of low side switch S2 410.

In the example shown, the low side switch S2 410 includes a first transistor Q1 411 and a second transistor Q2 412 with its respective body diode. The first transistor Q1 411 may be a JFET or a GaN HEMT while the second transistor Q2 may be a MOSFET. The drain 414 of the low side switch 410 (drain of the first transistor Q1 411) is coupled to the high side switch S1 452. The source 415 of the low side switch S2 410 (source of the second transistor Q2 412) is coupled to input return 409. The gate of first transistor Q1 411 is also coupled to input return 409, while the gate of the second transistor Q2 412 is the gate 417 (also referred to as control input) of the low side switch S2 410, and is coupled to receive the second drive signal $U_{LS}$ 436 from the controller 428. Further, the source of the first transistor Q1 411 is coupled to the drain of second transistor Q2 412 and is illustrated as node 413, which is coupled to the tap 416. As will be further discussed, the voltage the tap 416 (node 413) or the current through the first transistor Q1 411 may be monitored to sense the voltage on the drain 414 of the low side switch S2 410 or the half bridge voltage $V_{HB}$ 456.

The energy transfer element T1 404 includes the primary winding 405, a first output winding 406, and a second output winding 407. The first output winding 406 and the second output winding 407 are center tapped, or in other words, the terminal between the first output winding 406 and the second output winding 407 is coupled to output return 419. The first output winding 406 is also coupled to rectifier D1 418, while the second output winding 407 is coupled to the rectifier D2 421. Energy is transferred and rectified by rectifier D1 418 when the high side switch S1 453 is turned ON and the low side switch S2 410 is OFF. When the high side switch S1 453 is OFF and the low side switch S2 410 is ON, energy is transferred and rectified by rectifier D2 421. One end of the output capacitor $C_O$ 420 is coupled to both rectifiers D1 418 and D2 421, while the other end of the output capacitor $C_O$ 420 is coupled to output return 419. The load 422 is coupled across the output capacitor $C_O$ 420. An output is provided to the load 422 and may be provided as either an output voltage $V_O$ 423, an output current $I_O$ 424, or a combination of the two. The resonant power converter 400 further includes circuitry to regulate the output, which is exemplified as output quantity $U_O$ 425. The output quantity $U_O$ 425 may be either an output voltage $V_O$ 423, an output current $I_O$ 423, or a combination of the two. A sense circuit 426 is coupled to sense the output quantity $U_O$ 425 and to provide feedback signal $U_{FB}$ 427 to the controller 428.

Similar to the controller 128 discussed with respect to FIG. 1, controller 428 is shown as including drive circuit 432 and tap sense circuit 434. The tap sense circuit 434 is coupled to receive either the voltage at node 413 or the current across the first transistor Q1 411 via the tap 416. The tap sense circuit 434 compares the voltage at node 413/tap 416 or the current across the first transistor Q1 411 to a threshold and outputs the indicator signal $U_Z$ 435, which indicates if the voltage at the node 413/tap 416 or the current across the first transistor Q1 411 is above or below the threshold. As discussed above, the voltage and current at the source of the first transistor Q1 411 follows the voltage and current and the drain of the first transistor Q1 411 (drain 414) when the voltage at the drain of the first transistor Q1 411 (drain 414) is less than the pinch-off voltage of the first transistor Q1 411. As such, the tap sense circuit 434 can determine if the voltage at the drain 414 is above or below the threshold if the threshold is less than the pinch off voltage of the first transistor Q1 411. The drive circuit 432 is coupled to receive the feedback signal $U_{FB}$ 427 and the indicator signal $U_Z$ 435 to output the first and second drive signals $U_{HS}$ 457 and $U_{LS}$ 436. The controller 432 may use the information regarding the half bridge voltage $V_{HB}$ 456 provided by the indicator signal $U_Z$ 435 to facilitate soft switching and zero voltage switching of the resonant power converter 400.

Figure 5:
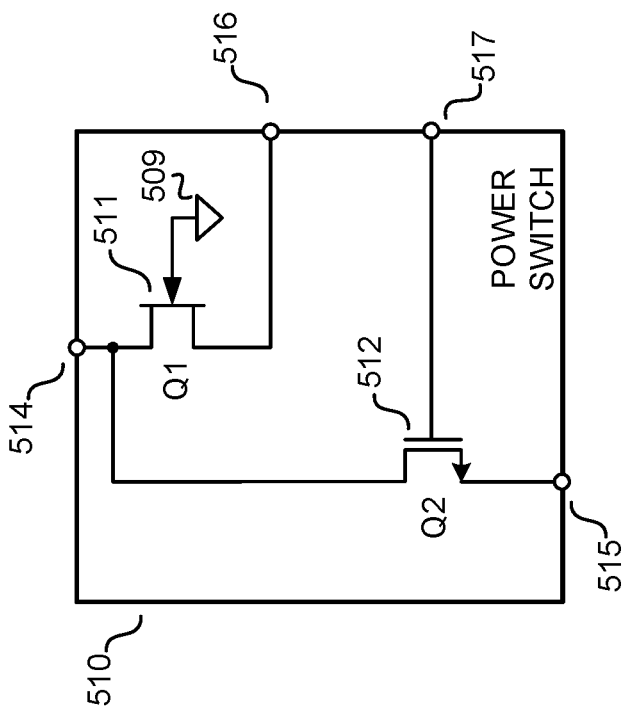
FIG. 5 is an example schematic of a power switch, in accordance with an embodiment of the disclosure.

FIG. 5 illustrates another example power switch 510, which may be one example of power switch 110, 310 and 410 discussed above with respect to FIGS. 1, 3A, 3B, 3C and 4. In one example, power switch 510 includes a first transistor Q1 511 and a second transistor Q2 512. One end of the first transistor Q1 511 is coupled to a drain 514 of power switch 510, and the other end of the first transistor Q1 511 is coupled to a tap 516 of the power switch 510. The control input of the first transistor Q1 511 is coupled to the input return 509. One end of the second transistor Q2 512 is also coupled to the drain 514 of power switch 514 as well as a first end of the first transistor Q1 511. The other end of the second transistor Q2 512 is coupled to the source 515 of the power switch 510. The control input of the second transistor Q2 512 is coupled to the gate 517 of the power switch 510.

To illustrate, the example depicted in FIG. 5 shows the power switch 510 is exemplified as included a JFET 511 or a GaN HEMT and a MOSFET 512. In one example, the second transistor Q2 512 may be a high voltage transistor. The drain 514 of the power switch 510 is coupled to both the drain of the first transistor Q1 511 and drain of the second transistor Q2 512. The source 515 of the power switch 510 is coupled to the source of the second transistor Q2 512. The gate of the first transistor Q1 511 is coupled to input return 509 while the gate of the second transistor Q2 512 is the gate 517 of the power switch 510, which is coupled to receive a drive signal $U_{DR}$ from a controller. Further, the source of the first transistor 511 is coupled to tap 516. The second transistor Q2 512 may be used as the main switching element of the power switch 510 while the first transistor Q1 511 may be used to divert a portion of the drain current $I_D$ conducted through the power switch 510. In one example, the diverted current may be used to charge a supply capacitor during startup of a power converter. As discussed above, the voltage at the tap 516 or the current through the first transistor Q1 511 may be monitored to sense the voltage on the drain terminal 514 of the power switch 510 or the drain-source voltage $V_{DS}$ of the power switch 510.

Similar to what is discussed above, a tap sense circuit compares the voltage or current at tap 516 and outputs an indicator signal $U_Z$ which indicates if the voltage at the tap 516 or the current through the first transistor 511 is above or below a threshold. The voltage and current at the source of the first transistor Q1 511 follows the voltage and current at the drain of the first transistor Q1 511 (drain 514) when the voltage at the drain of the first transistor Q1 511 (drain terminal 514) is less than the pinch-off voltage of the first transistor Q1 511. As such, the tap sense circuit can determine if the voltage at the drain terminal 514 is above or below the threshold if the threshold is less than the pinch off voltage of the first transistor Q1 511.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for use in a power converter, comprising:
a power switch including a drain, a source, a control input, and a tap, wherein the power switch further includes a first transistor coupled to a second transistor, wherein a drain of the first transistor is coupled to the drain of the power switch, wherein a source of the first transistor is coupled to the tap, wherein a source current at the source of the first transistor is responsive to a drain voltage at the drain of the first transistor when the drain voltage at the drain of the first transistor is less than a pinch off voltage of the first transistor, and wherein the source current at the source of the first transistor is substantially equal to a maximum current when the drain voltage at the drain of the first transistor is greater than the pinch off voltage;
a tap sense circuit coupled to the tap of the power switch, wherein the tap sense circuit provides an indicator signal indicative of a voltage at the tap or a current through the first transistor; and
a drive circuit coupled to receive the indicator signal from the tap sense circuit, wherein the drive circuit is further coupled to receive a feedback signal representative of an output quantity at an output of the power converter, wherein the drive circuit is coupled to generate a drive signal coupled to control switching of the power switch to regulate a transfer of energy from an input of the power converter to the output of the power converter in response to the indicator signal and in response to the feedback signal.

2. The controller of claim 1, wherein a gate of the first transistor is coupled to an input return, wherein a drain of the second transistor is coupled to the drain of the power switch, wherein a gate of the second transistor is coupled to the control input coupled to receive the drive signal, and wherein a source of the second transistor is coupled to the source of the power switch.

3. The controller of claim 1, wherein a gate of the first transistor is coupled to an input return, wherein a drain of the second transistor is coupled to the tap of the power switch, wherein a gate of the second transistor is coupled to the control input coupled to receive the drive signal, and wherein a source of the second transistor is coupled to the source of the power switch.

4. The controller of claim 1, wherein the first transistor comprises a junction field effect transistor (JFET).

5. The controller of claim 1, wherein the first transistor comprises a high-electron-mobility transistor (HEMT).

6. The controller of claim 1, wherein the second transistor comprises a metal-oxide-semiconductor field effect transistor (MOSFET).

7. The controller of claim 1, wherein a source voltage at the source of the first transistor follows the drain voltage at the drain of the first transistor when the drain voltage at the drain of the first transistor is less than the pinch off voltage of the first transistor, wherein the source voltage at the source of the first transistor is equal to the pinch off voltage of the first transistor when the drain voltage at the drain of the first transistor is greater than the pinch off voltage.

8. The controller of claim 1, wherein the tap sense circuit comprises a comparator coupled to generate the indicator signal to indicate that the voltage at the tap has fallen below a voltage threshold value.

9. The controller of claim 8, wherein the drive circuit is coupled not to turn on the power switch until the voltage at the tap has fallen below the voltage threshold value.

10. The controller of claim 9, wherein the drive circuit is coupled not to turn on the power switch until the voltage at the tap has fallen to approximately zero volts.

11. The controller of claim 1, wherein the tap sense circuit comprises a comparator coupled to generate the indicator signal to indicate that the current through the first transistor has fallen below a current threshold value.

12. The controller of claim 11, wherein the drive circuit is coupled not to turn on the power switch until the current through the first transistor has fallen below the current threshold value.

13. The controller of claim 12, wherein the drive circuit is coupled not to turn on the power switch until the current through the first transistor has fallen to approximately zero amps.

14. The controller of claim 1, wherein the power converter has a flyback topology.

15. The controller of claim 1, wherein the drive signal is a low side drive signal and wherein the power switch is a low side switch, wherein the drive circuit is further coupled to generate a high side drive signal coupled to control switching of a high side switch coupled to the low side switch to regulate the transfer of energy from the input of the power converter to the output of the power converter in response to the indicator signal and in response to the feedback signal.

16. The controller of claim 15, wherein the power converter is a resonant power converter.

17. A power converter, comprising:
an energy transfer element coupled between an input of the power converter and an output of the power converter;
a power switch coupled to the energy transfer element and the input of the power converter, wherein the power switch includes a drain, a source, a control input, and a tap, wherein the power switch further includes a first transistor coupled to a second transistor, wherein a drain of the first transistor is coupled to the drain of the power switch, wherein a source of the first transistor is coupled to the tap, wherein a source current at the source of the first transistor is responsive to a drain voltage at the drain of the first transistor when the drain voltage at the drain of the first transistor is less than a pinch off voltage of the first transistor, and wherein the source current at the source of the first transistor is substantially equal to a maximum current when the drain voltage at the drain of the first transistor is greater than the pinch off voltage; and
a controller coupled to control the power switch, wherein the controller includes:
a tap sense circuit coupled to sense the tap of the power switch, wherein the tap sense circuit is coupled to generate an indicator signal that is indicative of a voltage at the tap of the power switch or a current from the tap of the power switch; and
a drive circuit coupled to receive the indicator signal from the tap sense circuit, wherein the drive circuit is further coupled to receive a feedback signal representative of an output quantity at the output of the power converter, wherein the drive circuit is coupled to generate a drive signal coupled to control switching of the power switch to regulate a transfer of energy from the input of the power converter to the output of the power converter in response to the indicator signal and in response to the feedback signal.

18. The power converter of claim 17, wherein a gate of the first transistor is coupled to an input return, wherein a drain of the second transistor is coupled to the drain of the power switch, wherein a gate of the second transistor is coupled to the control input coupled to receive the drive signal, and wherein a source of the second transistor is coupled to the source of the power switch.

19. The power converter of claim 17, wherein a gate of the first transistor is coupled to an input return, wherein a drain of the second transistor is coupled to the tap of the power switch, wherein a gate of the second transistor is coupled to the control input coupled to receive the drive signal, and wherein a source of the second transistor is coupled to the source of the power switch.

20. The power converter of claim 17, wherein the first transistor comprises a junction field effect transistor (JFET), and wherein the second transistor comprises a metal-oxide-semiconductor field effect transistor (MOSFET).

21. The power converter of claim 17, wherein the first transistor comprises a high-electron-mobility transistor (HEMT), and wherein the second transistor comprises a metal-oxide-semiconductor field effect transistor (MOSFET).

22. The power converter of claim 17, wherein a source voltage at the source of the first transistor follows the drain voltage at the drain of the first transistor when the drain voltage at the drain of the first transistor is less than the pinch off voltage of the first transistor, wherein the source voltage at the source of the first transistor is equal to the pinch off voltage of the first transistor when the drain voltage at the drain of the first transistor is greater than the pinch off voltage.

23. The power converter of claim 17, wherein the tap sense circuit comprises a comparator coupled to generate the indicator signal to indicate that the voltage at the tap or the current from the tap has fallen below a threshold value.

24. The power converter of claim 23, wherein the drive circuit is coupled not to turn on the power switch until the voltage at the tap or the current from the tap has fallen below the threshold value.

25. The power converter of claim 17, wherein the power converter has a flyback topology.

26. The power converter of claim 17, wherein the power converter is a resonant power converter.

* * * * *